(12) United States Patent
Yang et al.

(10) Patent No.: US 9,872,188 B2
(45) Date of Patent: Jan. 16, 2018

(54) ADAPTIVE FILTERING BASED NETWORK ANOMALY DETECTION

(71) Applicant: Futurewei Technologies, Inc., Plano, TX (US)

(72) Inventors: Kai Yang, Bridgewater, NJ (US); Baoling S. Sheen, Naperville, IL (US); Juan Roa, Hillsborough, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 215 days.

(21) Appl. No.: 14/810,968

(22) Filed: Jul. 28, 2015

(65) Prior Publication Data

US 2017/0034721 A1    Feb. 2, 2017

(51) Int. Cl.
*H04W 24/08*    (2009.01)

(52) U.S. Cl.
CPC ................................. *H04W 24/08* (2013.01)

(58) Field of Classification Search
CPC .... G06Q 10/10; G06Q 50/10; G06F 11/0709; G06F 11/079; H04L 43/12; H04L 41/0631; H04L 41/16; H04L 41/0645; H04L 41/0672; H04L 12/2464; H04L 65/80; H04W 24/08; H04N 21/4667; H04N 21/442; H04N 21/64738
See application file for complete search history.

(56) References Cited

U.S. PATENT DOCUMENTS

| | | | | |
|---|---|---|---|---|
| 2005/0181835 A1* | 8/2005 | Lau | ........................ | H04L 41/042 455/567 |
| 2006/0229931 A1* | 10/2006 | Fligler | ................... | G06Q 30/02 705/7.38 |
| 2007/0195695 A1* | 8/2007 | Healy | ................. | H04L 41/5067 370/230 |
| 2010/0088410 A1* | 4/2010 | Ridley | ................ | H04L 41/0896 709/224 |

(Continued)

FOREIGN PATENT DOCUMENTS

| | | |
|---|---|---|
| CN | 101030798 | 9/2007 |
| CN | 101702824 | 5/2010 |

(Continued)

OTHER PUBLICATIONS

"International Application No. PCT/CN2016/091928, International Search Report dated Sep. 28, 2016", (Sep. 28, 2016), 4 pgs.

(Continued)

*Primary Examiner* — Jung-Jen Liu
(74) *Attorney, Agent, or Firm* — Schwegman Lundberg & Woessner, P.A.

(57) ABSTRACT

A method includes performing, via a controller, adaptive filtering on a network quality indicator to predict future values of the network quality indicator, calculating, via the controller, residues between the predicted future values and measured values of the network quality indicator, analyzing, via the controller, the residues over at least one selected frequency band to determine if a threshold has been exceeded for the at least one selected frequency band, and (Continued)

detecting, via the controller, an anomaly event of the network in a frequency band in which a threshold has been exceeded using the residues and measured values of the network quality indicator.

25 Claims, 8 Drawing Sheets

(56) References Cited

U.S. PATENT DOCUMENTS

| | | | |
|---|---|---|---|
| 2010/0105865 A1* | 4/2010 | Telford | C07K 14/315 530/350 |
| 2010/0135172 A1* | 6/2010 | Cui | H04W 72/1231 370/252 |
| 2010/0279702 A1* | 11/2010 | Kazmi | H04B 7/0817 455/452.2 |
| 2010/0291959 A1 | 11/2010 | Inaida | |
| 2012/0157089 A1* | 6/2012 | Yang | H04L 12/2464 455/424 |
| 2013/0097304 A1* | 4/2013 | Asthana | H04L 41/5025 709/224 |
| 2013/0114446 A1* | 5/2013 | Liu | H04W 24/10 370/252 |
| 2013/0262656 A1* | 10/2013 | Cao | H04L 41/142 709/224 |
| 2014/0068348 A1* | 3/2014 | Mondal | H04L 41/16 714/45 |
| 2014/0256310 A1* | 9/2014 | Wang | H04W 24/08 455/423 |
| 2014/0337871 A1* | 11/2014 | Garcia De Blas | H04N 21/64738 725/14 |
| 2015/0201428 A1* | 7/2015 | Mills | H04L 1/0026 455/452.2 |
| 2015/0373501 A1* | 12/2015 | Dribinski | H04W 4/021 455/456.1 |
| 2016/0162783 A1* | 6/2016 | Tan | H04W 24/02 706/13 |
| 2016/0165462 A1* | 6/2016 | Tan | H04W 24/02 370/254 |
| 2016/0165469 A1* | 6/2016 | Gopalakrishnan | H04W 24/02 455/67.11 |
| 2016/0165472 A1* | 6/2016 | Gopalakrishnan | H04W 24/10 455/67.11 |
| 2017/0034721 A1* | 2/2017 | Yang | H04W 24/08 |
| 2017/0094537 A1* | 3/2017 | Yang | H04W 24/04 |

FOREIGN PATENT DOCUMENTS

| | | |
|---|---|---|
| CN | 101933360 | 12/2010 |
| CN | 103297179 | 9/2013 |
| EP | 1521489 | 4/2005 |

OTHER PUBLICATIONS

Knorn, Florian, et al., "Adaptive Kalman Filtering for anomaly detection in software appliances", IEEE INFOCOM Workshops 2008, Apr. 13-18, 2008, (Apr. 18, 2008), 6 pgs.

Mladenov, M., et al., "Fault monitoring and correction in a walking robot using LMS filters", 2008 International Workshop on Intelligent Solutions in Embedded Systems, Jul. 10-11, 2008, (Jul. 11, 2008), 10 pgs.

* cited by examiner

ADAPTIVE FILTERING BASED NETWORK ANOMALY DETECTION

BACKGROUND

The performance of a network, for example a wireless cellular network, can be measured using a collection of numerical indicators such as key quality indicators (KQI) and key performance indicators (KPI). The values of these indicators are affected by a number of factors, such as traffic load on the network, the number of current users of the network, and environmental wireless radio frequency (RF) transmission conditions. These factors are often time-varying and difficult to predict. What is needed is real-time detection or prediction of anomalous network behaviors (e.g. abnormal values of KQI or other such indicators) for effective management of a wireless network.

SUMMARY

Methods, apparatus and machine storage media are provided that perform adaptive filtering of wireless and wired network performance indicators for purposes of modeling and/or predicting network performance anomalies in advance of their occurrence. In one aspect, a method includes performing, via a controller, adaptive filtering on a wireless network quality indicator to predict future values of the wireless network quality indicator. The controller calculates residues between the predicted future values and measured values of the wireless network quality indicator, and analyzes the residues over at least one selected frequency band to determine if a threshold has been exceeded ("anomaly event") for the at least one selected frequency band, and detects an anomaly event of the wireless network in a frequency band in which a threshold has been exceeded using the residues, or a time series of residues, and measured values of the wireless network quality indicator.

Another aspect provides a controller for wireless network communication, the controller including a processor and a storage device coupled to the processor, the storage device having code for execution by the processor to perform a method including performing adaptive filtering on a wireless network quality indicator to predict future values of the wireless network quality indicator, calculating residues between the predicted future values and measured values of the wireless network quality indicator, analyzing the residues over at least one selected frequency band to determine if a threshold has been exceeded for the at least one selected frequency band, and detecting an anomaly event of the wireless network in a frequency band in which a threshold has been exceeded using the residues and measured values of the wireless network quality indicator. Various embodiments include more than one controller in the wireless network and include distributed processing to perform the method.

A machine readable storage device is provided that includes instructions for execution by a processor of the machine to perform, via a controller, adaptive filtering on a wireless network quality indicator to predict future values of the wireless network quality indicator. Residues between the predicted future values and measured values of the wireless network quality indicator are calculated and analyzed over at least one selected frequency band to determine if a threshold has been exceeded for the at least one selected frequency band. An anomaly event of the wireless network in a frequency band in which a threshold has been exceeded can be detected using the residues and measured values of the wireless network quality indicator.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention to be interpreted broadly, as defined by the appended claims.

The functions or algorithms described herein may be implemented in software or a combination of software and human implemented procedures in one embodiment. The software may be in the form of computer executable instructions stored on computer readable media or computer readable storage devices such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. Various embodiments include more than one controller in the wireless network and include distributed processing to perform the present subject matter.

In various embodiments, wireless and/or wired network performance is enhanced using adaptive filter based anomaly detection and prediction of one or more network quality indicator parameters, such as a key quality indicator (KQI) and a key performance indicator (KPI). An iceberg method, in which a "tip" detection method is used to identify frequency and time periods for subsequent contour completion and resulting anomaly event ("iceberg") detection, is employed in various embodiments.

Figure 1:
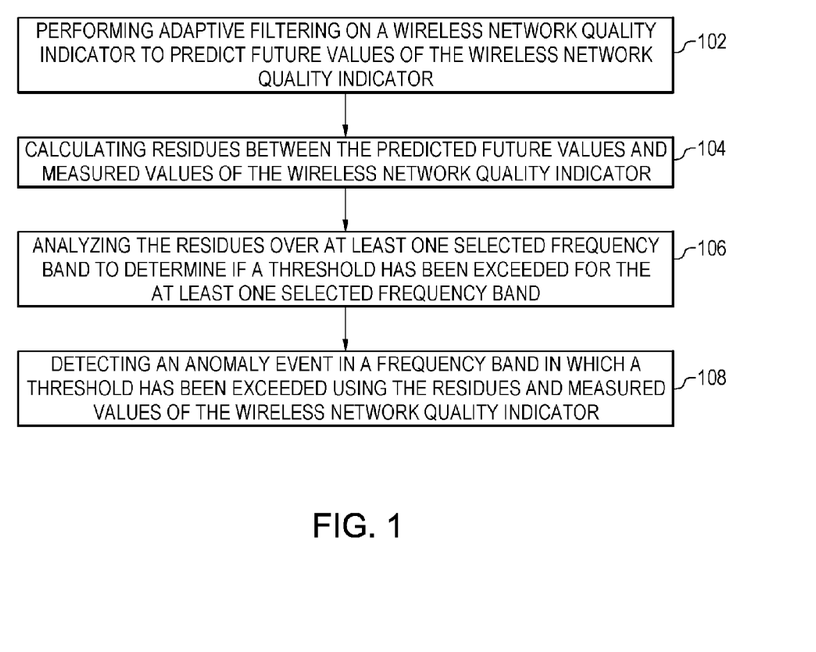
FIG. 1 is a flowchart illustrating a method for anomaly detection in a wireless network according to an example embodiment.

FIG. 1 is a flowchart illustrating a method for anomaly detection in a wireless network according to an example embodiment. In various embodiments, the method can be used for anomaly detection in a wired or wireline network. At 102, the method includes performing, via a controller, adaptive filtering on a wireless network quality indicator to predict future values of the wireless network quality indicator. Various embodiments of the method include calculating, via the controller, residues between the predicted future values and measured values of the wireless network quality indicator, at 104. At 106, various method embodiments include analyzing, via the controller, the residues (or time series of residues, in an embodiment) over at least one selected frequency band to determine if a threshold has been exceeded for the at least one selected frequency band. In various embodiments, the at least one selected frequency band includes a plurality of frequency bands. According to various embodiments, the method includes detecting, via the controller, an anomaly event of the wireless network in a frequency band in which a threshold has been exceeded using the residues and measured values of the wireless network quality indicator, at 108. Examples of network quality indicator include KQI and KPI, in various embodiments. Examples of KQI include initial video download delay and average video download throughput, in various embodiments. Examples of KPI include downlink congestion counter (a counter that indicates downlink traffic condition) and $E_c/N_o$ (carrier signal power-to-noise ratio, which is used to indicate coverage of a cell), in various embodiments. Other network quality indicators, such as other KQI and KPI, can be used without departing from the scope of the present subject matter.

Figure 2:
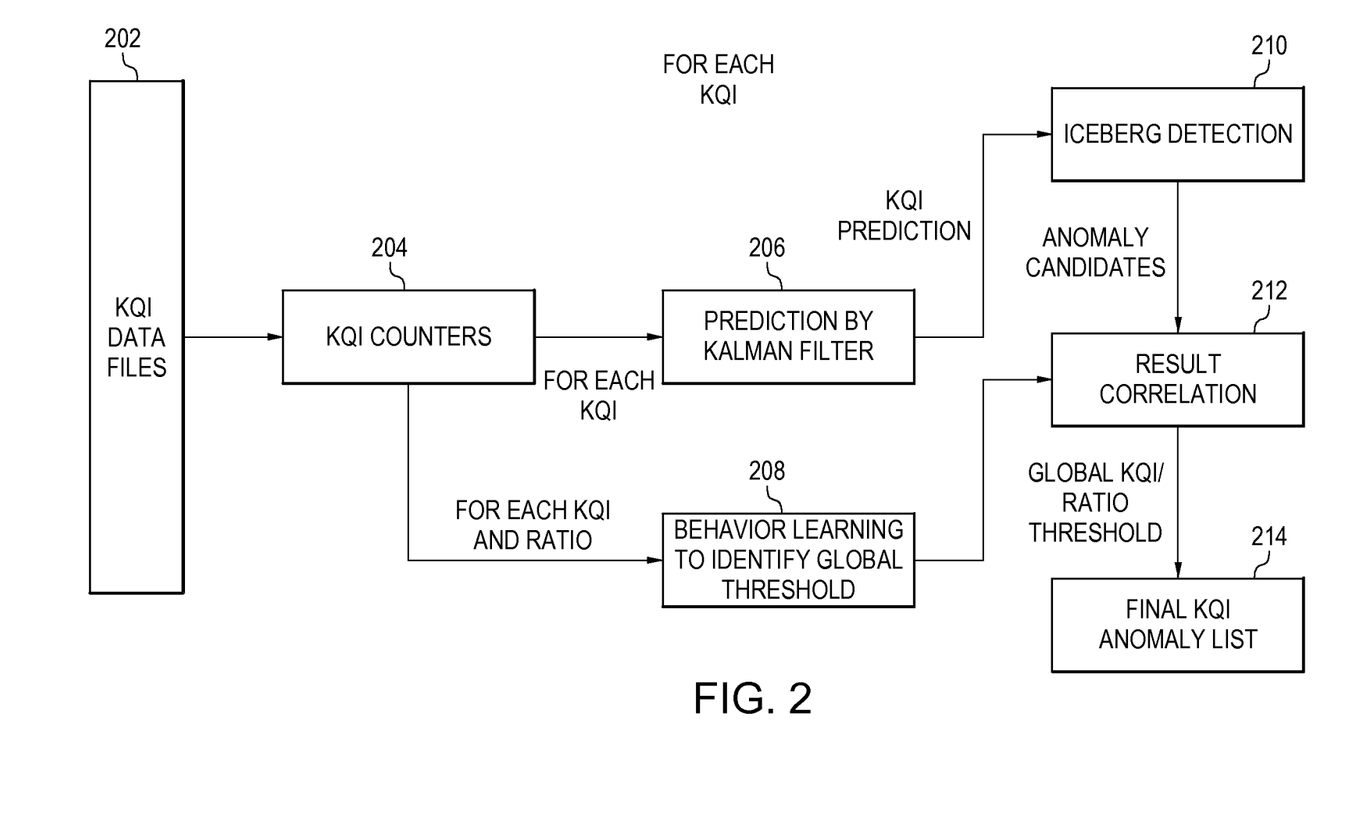
FIG. 2 is a block diagram of a system illustrating anomaly detection in a wireless network according to an example embodiment.

FIG. 2 is a block diagram of a system illustrating anomaly detection in a wireless network according to an example embodiment. In various embodiments, KQI counters 204 are used to obtain KQI values from data files 202. Adaptive filtering, such as Kalman filtering 206, is used to predict values of KQI in future time slots and the resulting predicted values are used for iceberg detection 210. Anomaly candidates identified using iceberg detection are correlated 212 using a global threshold generated using learned behavior 208 to obtain a final KQI anomaly list 214, in various embodiments. While the examples provided use KQI values for anomaly detection, other parameters (KPI, etc.) can be used without departing from the scope of the present subject matter.

Figure 3:
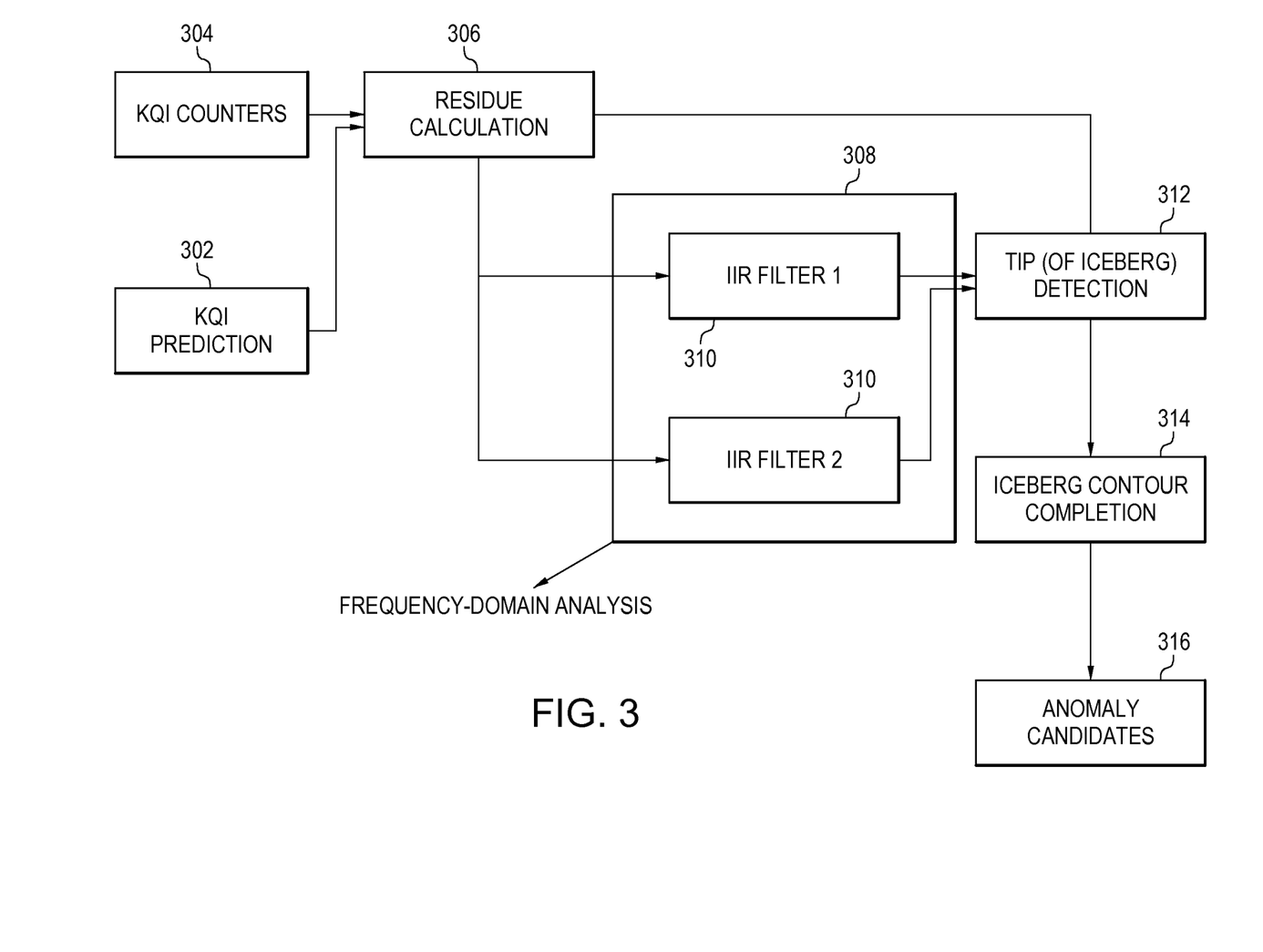
FIG. 3 is a block diagram illustrating anomaly detection in a wireless network according to an example embodiment.

FIG. 3 is a block diagram illustrating anomaly detection in a wireless network according to an example embodiment. As stated above, this anomaly detection can also be used in wired or wireline networks. A residue calculation 306 is performed using measured values of KQI from KQI counters 304 and a KQI prediction 302 generated using adaptive filtering, according to various embodiments. In various embodiments, frequency domain analysis 308 is performed (using one or more infinite impulse response filters (IIR) 310 or finite impulse response filters (FIRs) in various embodiments) using the results of the residue calculation. A tip of an iceberg is detected 312 using results from the residue calculation and the frequency domain analysis, in various embodiments. After a tip is detected, iceberg contour completion 314 is performed to obtain anomaly candidates 316, according to various embodiments of the present subject matter.

According to various embodiments, the present subject matter provides anomaly detection in wireless networks, or cellular network monitoring, using a controller, such as a radio network controller (RNC) or base station controller. In various embodiments, a cellular network is modeled as a dynamic system governed by a number of hidden Markov states. The KQI values are the measurement of such a dynamic system, e.g., the average video download throughput within an hour for a cell or RNC. In various embodiments, the system is timeslotted, with each time slot one hour, one day, a quarter or half of an hour, for example. Other time divisions can be used without departing from the scope of the present subject matter. Various embodiments of the present subject matter provide an iceberg method for anomaly detection to detect KQI anomalies in a wireless network at RNC or cell level. In various embodiments, an anomaly event is defined as a sequence of consecutive KQI anomalies and can be viewed as an "iceberg". In an iceberg method of the present subject matter, an adaptive Kalman filtering approach is employed to predict network status (KQI values) in incoming time slots based on the past observations of KQI. An embodiment provides for calculation of the residues of the KQIs when the measurement of KQI in the next time slot is available. KQIs are calculated by comparing the prediction generated by the Kalman filter with the KQI measurements. In one example, the KQI residues and data streams generated by one or more IIR filters are fed into the iceberg tip detection block for anomaly detection in various embodiments. In the tip detection stage, a residue clustering algorithm is used to find the time slots in which the predicted KQI values deviate significantly from the measured KQI values, in various embodiments. According to various embodiments, an iceberg contour completion algorithm is employed to detect the full body of the iceberg (the anomaly event) from the tips of the iceberg. According to various embodiments, the output of the iceberg detection stage is a group of anomaly candidates, which are corrected using the global KQI and thresholds derived from the original KQI counters to remove false alarms, and subsequently output as a list of anomalies. The prediction of an anomaly event can also be accomplished by detecting a "breakout" from a resistance line, in various embodiments.

According to various embodiments, adaptive filtering is used to predict the KQI values in the future based on the past history. Once the measurement is available, residues between the prediction and the real measurements are calculated in various embodiments. The resulting residues, or a time series of residues, are fed into multiple IIR filters to analyze the residues over different frequency bands, according to various embodiments. In various embodiments, if the output of any IIR filter exceeds a threshold, a tip of an iceberg is identified. According to one example, the residues and original KQI values are sent to an anomaly event detector. The anomaly event detector can check the residues and original KQI values and complete an iceberg contour by using a morphological filtering process.

Figure 4:
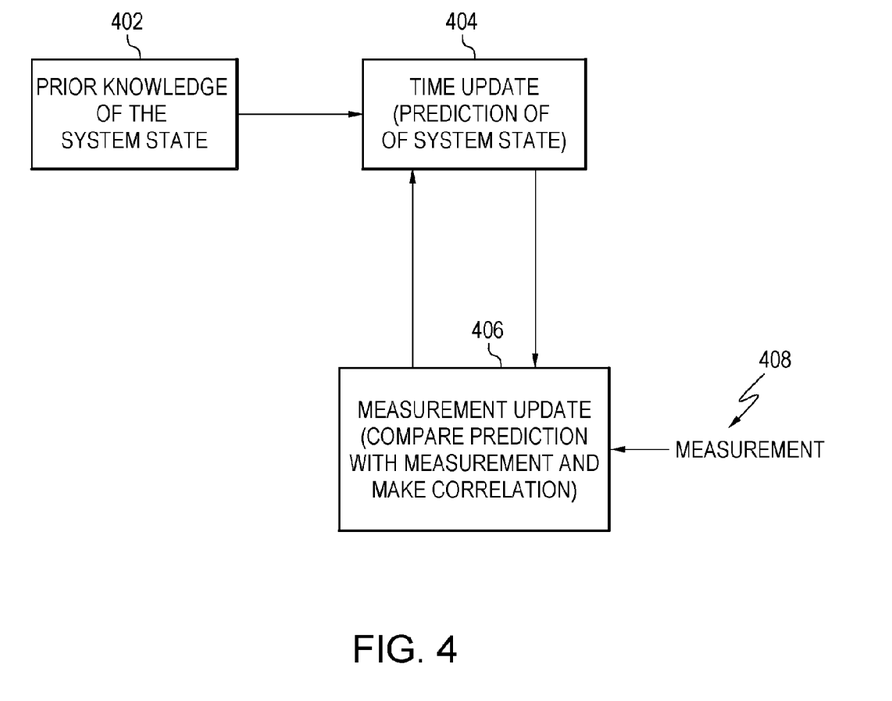
FIG. 4 is a block flow diagram illustrating a method of filtering for use in anomaly detection in a wireless network according to an example embodiment.

FIG. 4 illustrates a method of filtering for use in anomaly detection in a wireless network according to an example embodiment. Adaptive filtering, such as Kalman filtering, is used to predict future values of parameter values using prior knowledge of the state of the parameter 402 and measurements of the parameter 408. Steps in the depicted adaptive filtering embodiment include a prediction step 404 based on a physical model, and an update step 406 that compares predictions to measurements, in various embodiments. In one embodiment, the Kalman filtering includes a linear state space model, using the following computations:

$$x_{k+1} = fx_k + bu_k + n_k$$

$$y_k = hx_k + v_k$$

$x_k$: (Hidden) system state at the $k^{th}$ time slot (can be hour or day)
f, b: Coefficients
$u_k$: Input at the $k^{th}$ time slot
$n_k, v_k$: Process and measurement noises
Adaptive Filter: To model a physical process using a linear state space model $$x_{k+1} = x_{k+1-T} + u_k + n_k$$

$$y_k = x_k$$

$x_k$: KQI at the $k^{th}$ time slot
$u_k$: The input at the $k^{th}$ time slot $$x_{k+1|k} = x_{k+1-T} + u'_k$$

$$y_{k+1|k} = x_{k+1|k}$$

$$e_{k+1|k} = y_{k+1} - y_{k+1|k}$$

Figure 5:
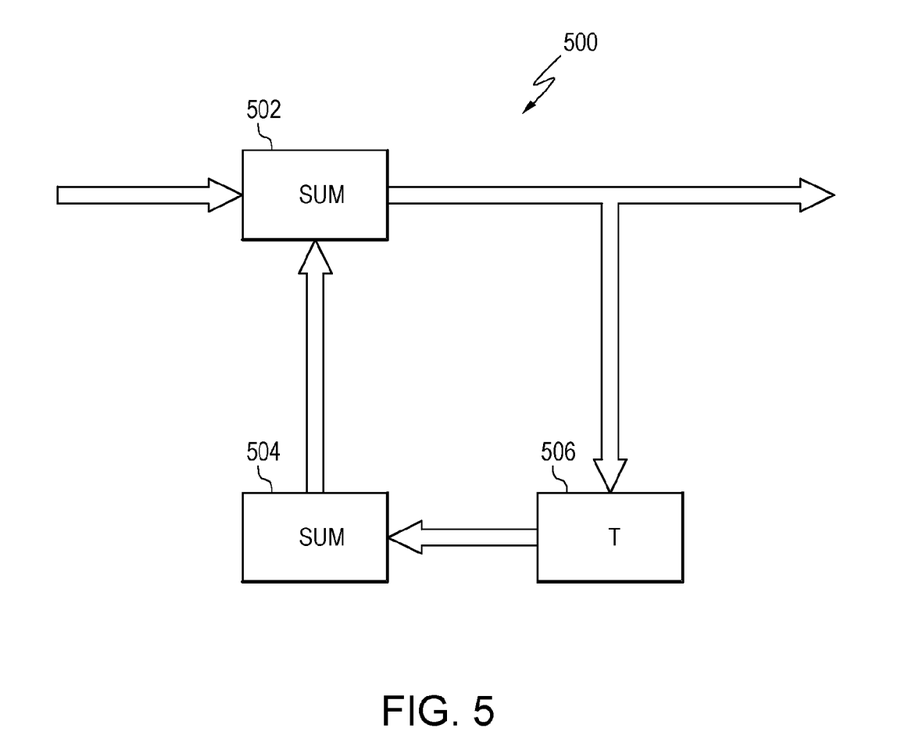
FIG. 5 is a block diagram illustrating an example filter for use in anomaly detection in a wireless network according to an example embodiment.

$u'_1$ is estimated and filtered by a low pass filter
$x_{k|k}$: Estimated KQI at the $k^{th}$ time slot
$x_{k+1|k}$: Estimated KQI at the $k^{th}$ time slot FIG. 5 illustrates an example filter for use in anomaly detection in a wireless network according to an example embodiment. The depicted filter 500, such as an IIR or FIR filter, is used in frequency domain analysis as described in FIG. 3, for example. The filter 500 includes an input, summation steps 502 and 504, a delay step 506, and an output, in various embodiments. The filter 500 includes a one-tap IIR filter for computational efficient frequency domain analysis of the residue signal, by decomposing the signal into multiple signals in different frequency bands, in various embodiments. IIR filters with more than one tap or FIR filters may be used in various embodiments.

Figure 6:
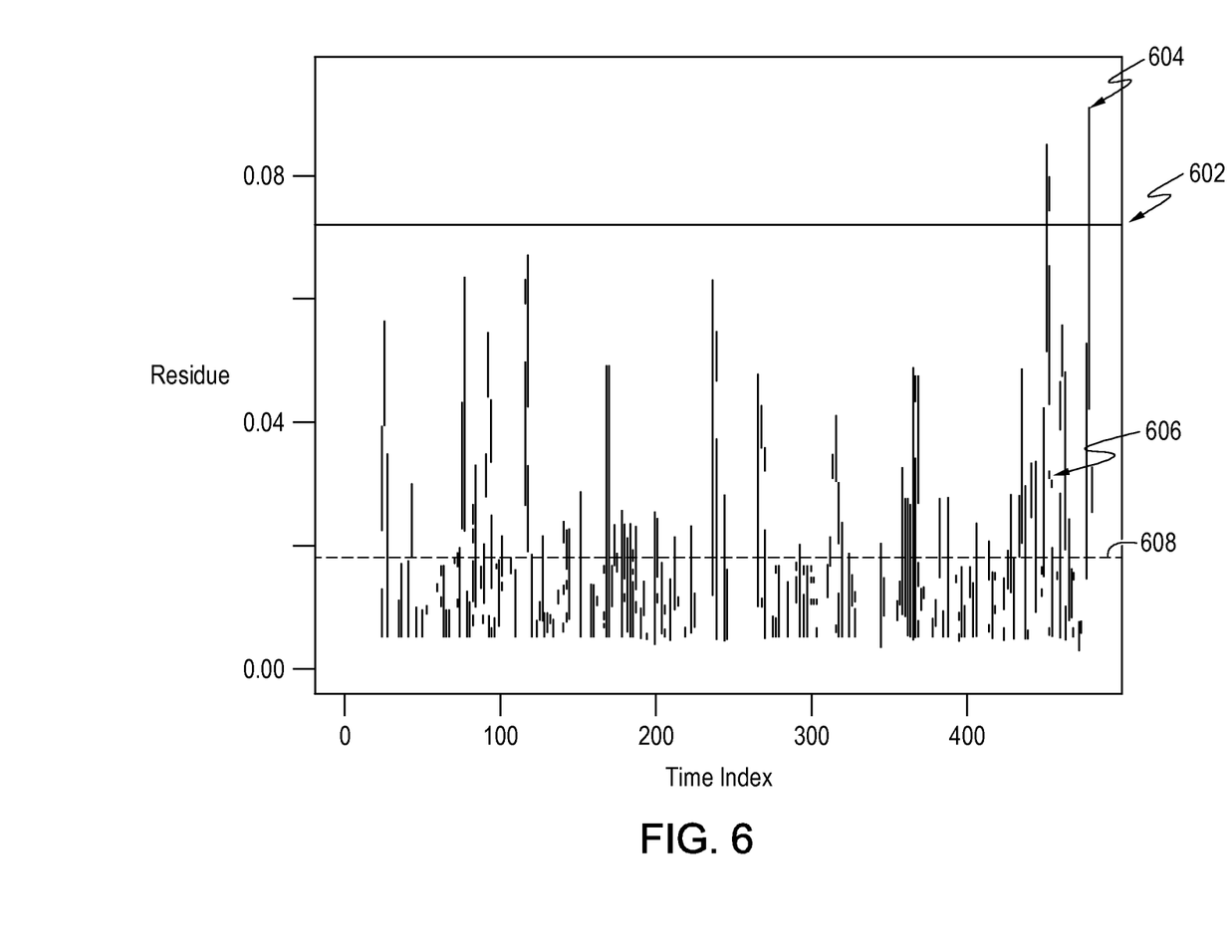
FIGS. 6-7 are graphs illustrating data derived using anomaly detection in a wireless network according to example embodiments.
Figure 7:
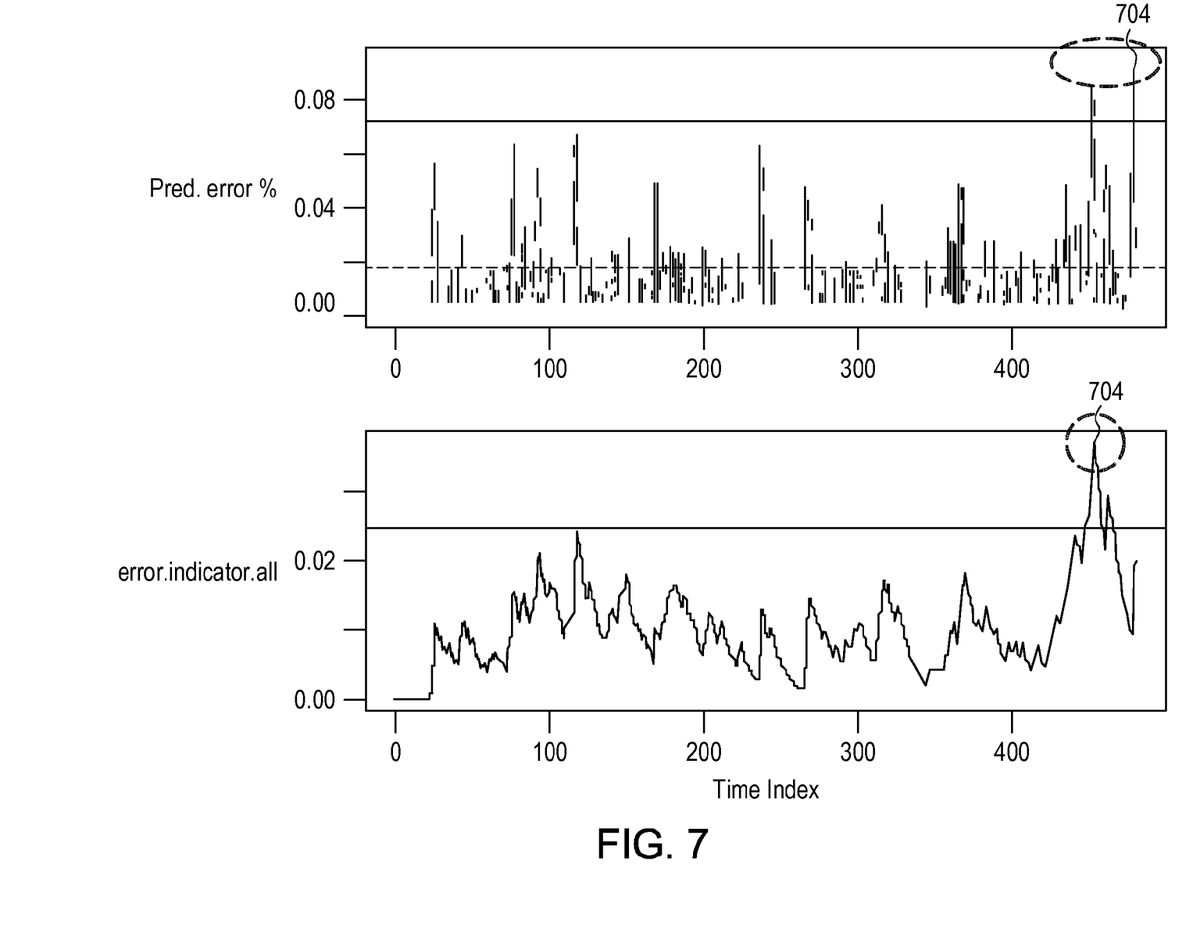

FIGS. 6-7 illustrate graphical depictions of data derived using anomaly detection in a wireless network according to an example embodiment. In FIG. 6, the residue is shown versus time and compared to a threshold 602 to identify tips 604 of the iceberg. Two such tips 604 are illustrated in FIG. 6. The residue tips 604 are a local maximum that corresponds to an anomaly event, in various embodiments. In various embodiments, detection of such anomaly events can be indicated by an alarm, such as an audible, visual and/or tactile alarm. In one example, training threshold 608 is calculated through a training process assuming the network operates in a normal condition. In various embodiments, a subsequent iceberg contour completion 606 is performed using a controller to identify anomaly events for the wireless network. FIG. 7 depicts graphs of predicted error rate and error indicator versus time, showing identified iceberg tips 704 as predicted using a method of the present subject matter.

Various embodiments of the present subject matter may provide for computationally simple, fully adaptive, tunable, and easy to implement anomaly detection in wireless network communication, and further provides superior performance over traditional algorithms in terms the accuracy of prediction, precision and recall of the anomaly detection. In addition, the system of the present subject matter utilizes relatively little memory, has a relatively low complexity, is portable (can be extended to other parameters and networks) and can be used in real-time operation to provide early warning of an anomaly. The present subject matter can be used to automatically monitor and detect anomalous behaviors in wireless cellular networks such 3G UMTS and 4G LTE systems, as well as other wireless communication networks. Thus, the present subject matter is superior to previous solutions, which were not real time-based and did not provide an advanced warning of network anomalies associated with service disruptions, such as dropped calls and poor cellular signals. Many of the foregoing aspects of network degradation can be reduced, and ultimately even eliminated, through appropriate network management practices (traffic diversion to other cells, etc.) if the degradation can be identified far enough in advance of actual occurrence.

Figure 8:
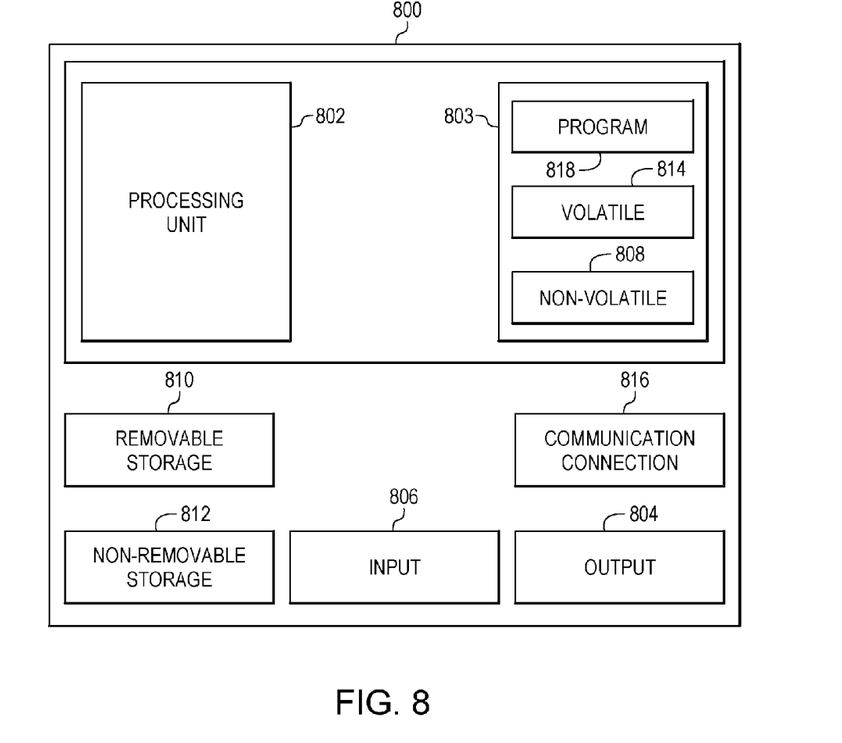
FIG. 8 is a block diagram illustrating circuitry for implementing devices to perform methods according to an example embodiment.

FIG. 8 is a block schematic diagram of a computer system 800 to implement the controller and methods according to example embodiments. All components need not be used in various embodiments. One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, or other computing device including the same or similar elements as illustrated and described with regard to FIG. 8. Devices such as smartphones, tablets, and smartwatches are generally collectively referred to as mobile devices. Further, although the various data storage elements are illustrated as part of the computer 800, the storage may also or alternatively include cloud-based storage accessible via a network, such as the Internet. Various embodiments include more than one controller in the wireless network and include distributed processing to perform the methods of the present subject matter. For example, each base station in a cellular network may have a controller or controllers that can exchange messages with other controllers and control the network in a distributed fashion.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular (3G, 4G, LTE, beyond LTE, 5G, etc.), WiFi, Bluetooth, and other networks.

Computer-readable instructions stored on a computer-readable medium are executable by the processing unit 802 of the computer 800. A hard drive, CD-ROM, and RAM are some examples of articles including a non-transitory computer-readable medium, such as a storage device. The terms computer-readable medium and storage device do not include carrier waves. For example, a computer program 818 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 800 to provide generic access controls in a COM based computer network system having multiple users and servers.

EXAMPLES

1. A method comprising:
performing, via a controller, adaptive filtering on a wireless network quality indicator to predict future values of the wireless network quality indicator;
calculating, via the controller, residues between the predicted future values and measured values of the wireless network quality indicator;
analyzing, via the controller, the residues over at least one selected frequency band to determine if a threshold has been exceeded for the at least one selected frequency band; and
detecting, via the controller, an anomaly event of the wireless network in a frequency band in which a threshold has been exceeded using the residues and measured values of the wireless network quality indicator.

2. The method of example 1 wherein the adaptive filtering includes Kalman filtering.

3. The method of any of examples 1-2 wherein the at least one selected frequency band includes a plurality of frequency bands.

4. The method of any of examples 1-3 wherein the wireless network quality indicator includes a key quality indicator (KQI).

5. The method of any of examples 1-2 wherein the wireless network quality indicator includes a key performance indicator (KPI).

6. The method of any of examples 1-5 wherein analyzing the residues over the at least one selected frequency band includes using an infinite impulse response (IIR) filter for the at least one selected frequency band.

7. The method of example 6 comprising performing a residue clustering algorithm, using the residues and data streams generated by the IIR filter, to determine time slots in which predicted future values deviate from measured values.

8. The method of example 7 comprising performing a contour completion algorithm to detect the anomaly event for the determined time slots.

9. The method of any of examples 1-8 wherein detecting the anomaly event includes completing a contour using a morphological filtering process.

10. The method of any of examples 1-9 wherein the adaptive filtering includes using a linear state space model.

11. The method of any of examples 1-10 further comprising providing an alarm if an anomaly event has been detected.

12. A controller for network communication, the controller comprising:
a processor; and
a storage device coupled to the processor, the storage device having code for execution by the processor to perform a method comprising:
performing adaptive filtering on a network quality indicator to predict future values of the network quality indicator;
calculating residues between the predicted future values and measured values of the network quality indicator;
analyzing the residues over at least one selected frequency band to determine if a threshold has been exceeded for the at least one selected frequency band; and
detecting an anomaly event of the network in a frequency band in which a threshold has been exceeded using the residues and measured values of the network quality indicator.

13. The controller of example 12 wherein the method performed by the processor comprises:
performing a residue clustering algorithm, using the residues and data streams generated by IIR filters, to determine time slots in which predicted future values deviate from measured values.

14. The controller of example 13 wherein the method performed by the processor comprises:
performing a contour completion algorithm to detect the anomaly event for the determined time slots.

15. The controller of any of examples 12-14 wherein the adaptive filtering includes Kalman filtering.

16. The controller of any of examples 12-15 wherein the at least one selected frequency band includes a plurality of frequency bands.

17. The controller of any of examples 12-16 wherein method performed by the processor comprises:
providing an alarm if an anomaly event has been detected.

18. A machine readable storage device comprising instructions that, when executed by a machine processor, cause the processor to:
perform adaptive filtering on a network quality indicator to predict future values of the network quality indicator;
determine residues between the predicted future values and measured values of the network quality indicator;
analyze the residues over at least one selected frequency band to determine if a threshold has been exceeded for the at least one selected frequency band; and
detect an anomaly event in the network.

19. The machine readable storage device of example 18 wherein the network quality indicator includes a key quality indicator (KQI).

20. The machine readable storage device of example 18 wherein the network quality indicator includes a key performance indicator (KPI).

21. A computer program stored on a nonvolatile computer readable medium, the program comprising instructions that, when executed by a machine processor, cause the processor to:
perform adaptive filtering on a network quality indicator to predict future values of the network quality indicator;
determine residues between the predicted future values and measured values of the network quality indicator;
analyze the residues over at least one selected frequency band to determine if a threshold has been exceeded for the at least one selected frequency band; and
detect an anomaly event in the network.

22. The computer program of example 21 wherein detecting the anomaly event includes completing a contour using a morphological filtering process.

23. The computer program of any of examples 21-22 wherein the adaptive filtering includes using a linear state space model.

24. The computer program of any of examples 21-23 further comprising instructions that, when executed by the processor, cause the processor to provide an alarm if an anomaly event has been detected.

25. The computer program of any of examples 21-24 wherein the at least one selected frequency band includes a plurality of frequency bands.

26. A method comprising:
    performing, via a controller, adaptive filtering on a network quality indicator to predict future values of the network quality indicator;
    calculating, via the controller, residues between the predicted future values and measured values of the network quality indicator;
    analyzing, via the controller, the residues over at least one selected frequency band to determine if a threshold has been exceeded for the at least one selected frequency band; and
    detecting, via the controller, an anomaly event of the network in a frequency band in which a threshold has been exceeded using the residues and measured values of the network quality indicator.

27. The method of example 26 wherein the adaptive filtering includes Kalman filtering.

28. The method of any of examples 26-27 wherein analyzing the residues over the at least one selected frequency band includes using an infinite impulse response (IIR) filter or finite impulse response (FIR) filter for the at least one selected frequency band.

29. The method of example 28 comprising performing a residue clustering algorithm, using the residues and data streams generated by the IIR filter, to determine time slots in which predicted future values deviate from measured values.

30. The method of example 29 comprising performing a contour completion algorithm to detect the anomaly event for the determined time slots.

Although some embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
    performing, via a controller, adaptive filtering on a wireless network quality indicator to predict future values of the wireless network quality indicator;
    calculating, via the controller, residues between the predicted future values and measured values of the wireless network quality indicator;
    analyzing, via the controller, the residues over at least one selected frequency band using an infinite impulse response (IIR) filter or finite impulse response (FIR) filter to determine if a threshold has been exceeded for the at least one selected frequency band, including performing a residue clustering algorithm, using the residues and data streams generated by the IIR filter or FIR filter, to determine time slots in which predicted future values deviate from measured values; and
    detecting, via the controller, an anomaly event of the wireless network in a frequency band in which a threshold has been exceeded using the residues and measured values of the wireless network quality indicator.

2. The method of claim 1 wherein the adaptive filtering includes Kalman filtering.

3. The method of claim 1 wherein the at least one selected frequency band includes a plurality of frequency bands.

4. The method of claim 1 wherein the wireless network quality indicator includes a key quality indicator (KQI).

5. The method of claim 1 wherein the wireless network quality indicator includes a key performance indicator (KPI).

6. The method of claim 1 comprising performing a contour completion algorithm to detect the anomaly event for the determined time slots.

7. The method of claim 1 wherein detecting the anomaly event includes completing a contour using a morphological filtering process.

8. The method of claim 1 wherein the adaptive filtering includes using a linear state space model.

9. The method of claim 1 further comprising providing an alarm if an anomaly event has been detected.

10. A controller for wireless network communication, the controller comprising:
    a processor; and
    a storage device coupled to the processor, the storage device having code for execution by the processor to perform a method comprising:
    performing adaptive filtering on a wireless network quality indicator to predict future values of the wireless network quality indicator;
    calculating residues between the predicted future values and measured values of the wireless network quality indicator;
    analyzing the residues over at least one selected frequency band to determine if a threshold has been exceeded for the at least one selected frequency band, including performing a residue clustering algorithm, using the residues and data streams generated by IIR filters, to determine time slots in which predicted future values deviate from measured values; and
    detecting an anomaly event of the wireless network in a frequency band in which a threshold has been exceeded using the residues and measured values of the wireless network quality indicator.

11. The controller of claim 10 wherein the method performed by the processor comprises:
    performing a contour completion algorithm to detect the anomaly event for the determined time slots.

12. The controller of claim 10 wherein the adaptive filtering includes Kalman filtering.

13. The controller of claim 10 wherein the at least one selected frequency band includes a plurality of frequency bands.

14. The controller of claim 10 wherein the method performed by the processor comprises:
    providing an alarm if an anomaly event has been detected.

15. A machine readable storage device comprising instructions that, when executed by a machine processor, cause the processor to:
    perform adaptive filtering on a wireless network quality indicator to predict future values of the wireless network quality indicator;
    determine residues between the predicted future values and measured values of the wireless network quality indicator;
    analyze the residues over at least one selected frequency band to determine if a threshold has been exceeded for the at least one selected frequency band, including performing a residue clustering algorithm, using the residues and data streams generated by an IIR filter or FIR filter, to determine time slots in which predicted future values deviate from measured values; and
    detect an anomaly event in the wireless network.

16. The machine readable storage device of claim 15 wherein the wireless network quality indicator includes a key quality indicator (KQI).

17. The machine readable storage device of claim 15 wherein the wireless network quality indicator includes a key performance indicator (KPI).

18. A computer program stored on a nonvolatile computer readable medium, the program comprising instructions that, when executed by a machine processor, cause the processor to:
perform adaptive filtering on a wireless network quality indicator to predict future values of the wireless network quality indicator;
determine residues between the predicted future values and measured values of the wireless network quality indicator;
analyze the residues over at least one selected frequency band to determine if a threshold has been exceeded for the at least one selected frequency band, including performing a residue clustering algorithm, using the residues and data streams generated by an IIR filter or FIR filter, to determine time slots in which predicted future values deviate from measured values; and
detect an anomaly event in the wireless network.

19. The computer program of claim 18 wherein detecting the anomaly event includes completing a contour using a morphological filtering process.

20. The computer program of claim 18 wherein the adaptive filtering includes using a linear state space model.

21. The computer program of claim 18 further comprising instructions that, when executed by the processor, cause the processor to provide an alarm if an anomaly event has been detected.

22. The computer program of claim 18 wherein the at least one selected frequency band includes a plurality of frequency bands.

23. A method comprising:
performing, via a controller, adaptive filtering on a network quality indicator to predict future values of the network quality indicator;
calculating, via the controller, residues between the predicted future values and measured values of the network quality indicator;
analyzing, via the controller, the residues over at least one selected frequency band, including using an infinite impulse response (IIR) filter or finite impulse response (FIR) filter for the at least one selected frequency band and performing a residue clustering algorithm, using the residues and data streams generated by the IIR filter or the FIR filter, to determine time slots in which predicted future values deviate from measured values, to determine if a threshold has been exceeded for the at least one selected frequency band; and
detecting, via the controller, an anomaly event of the network in a frequency band in which a threshold has been exceeded using the residues and measured values of the network quality indicator.

24. The method of claim 23 wherein the adaptive filtering includes Kalman filtering.

25. The method of claim 23 comprising performing a contour completion algorithm to detect the anomaly event for the determined time slots.

* * * * *

UNITED STATES PATENT AND TRADEMARK OFFICE
CERTIFICATE OF CORRECTION

PATENT NO. : 9,872,188 B2
APPLICATION NO. : 14/810968
DATED : January 16, 2018
INVENTOR(S) : Yang et al.

It is certified that error appears in the above-identified patent and that said Letters Patent is hereby corrected as shown below:

In the Specification

In Column 5, Line 19, delete "$u'_1$" and insert --$u'_k$-- therefor

Signed and Sealed this
Twenty-fifth Day of June, 2019

Andrei Iancu
*Director of the United States Patent and Trademark Office*